United States Patent [19]

Tayloe et al.

[11] Patent Number: 5,790,951
[45] Date of Patent: Aug. 4, 1998

[54] METHOD AND APPARATUS FOR RECEIVING RING ALERT AND PAGING DATA IN AN INTERFERENCE ENVIRONMENT

[75] Inventors: Daniel Richard Tayloe, Phoenix; Nathan West Miller, Tempe; Robert Thomas Frederick, Chandler, all of Ariz.

[73] Assignee: Motorola, Inc., Schaumburg, Ill.

[21] Appl. No.: 707,163

[22] Filed: Sep. 3, 1996

[51] Int. Cl.$^6$ ................................................. H04B 7/185
[52] U.S. Cl. .................... 455/427; 455/13.2; 455/434; 455/515; 455/567
[58] Field of Search ............................ 455/427, 428, 455/429, 430, 12.1, 13.2, 13.3, 63, 432, 434, 436, 439, 443, 502, 515, 567, 67.1, 561, 562; 370/316, 317, 321, 324, 326, 331, 332, 334

[56] References Cited

U.S. PATENT DOCUMENTS 4,850,033  7/1989  Eizenhofer et al. .................... 455/434
5,539,921  7/1996  Tayloe .................................... 455/427
5,570,467  10/1996  Sawyer .................................. 455/515

*Primary Examiner*—Reinhard J. Eisenzopf
*Assistant Examiner*—Lester G. Kincaid
*Attorney, Agent, or Firm*—Walter W. Nielsen

[57] ABSTRACT

A communication system (100) includes satellites (102,104) and a mobile exchange unit (MXU) (120) for exchanging communication information with users. A satellite (102) generates synchronous timing frames requiring users operating through an MXU (120) to anticipate timing and frequency requirements to participate in communications. An MXU (120) must advance transmissions to a satellite (102) to insure transmissions arrive at satellite (102) within the proper synchronous receive window. Such advanced transmissions by MXU (120) interfere with reception of a ring alert/page transmission (130) which contains the location of broadcast channels (86) designating an incoming call or page data transmissions. The MXU (120) alternatively extracts a broadcast channel location from a candidate hand-off list being transmitted by a satellite (102) to in-use transceivers (310). The MXU 120 then distributes the location of the broadcast channel to those transceivers (310) presently not in-use.

15 Claims, 3 Drawing Sheets

METHOD AND APPARATUS FOR RECEIVING RING ALERT AND PAGING DATA IN AN INTERFERENCE ENVIRONMENT

FIELD OF THE INVENTION

The present invention relates generally to the field of wireless communications and, more particularly, to the field of synchronous communications between mobile elements of the communication system.

BACKGROUND OF THE INVENTION

Digital wireless communication systems employ synchronous or asynchronous transmission protocols. Synchronous transmission protocols requires rigid timing and structure of transmissions between communication elements. Typically, one communication element will be designated as the reference or origin communication element and other communication elements operating within the communication system must adhere to the timing and frequencies established by the reference communication element. A reference communication element transmits information to other communication elements consistent with the timing and frequency established within the communication system. Dispatched communication transmissions then propagate throughout the system to other communication elements. These reference communication elements receive the transmissions delayed in time proportional to the propagation distance of these non-reference elements. When either or both reference and non-reference communication elements are in motion, Doppler frequency variations are introduced.

Furthermore, in full duplex communication systems where units both transmit and receive, strict time slots are defined for transmission and reception in the synchronous time frame as established by the communication system. A reference communication element transmits information to non-reference communication elements during a specific time frame in the synchronous communication frame. Also, a received time frame is defined for reception of transmissions generated by non-reference communication elements for reception at a reference communication element. Because of the latency associated with the propagation path between non-reference communication elements and a reference communication element, non-reference communication elements must time advance their transmissions for compliant reception in the reference communication units synchronous receive frame. However, because of the diversity of propagation time delays associated with autonomous and frequently mobile non-reference communication units, each non-reference communication unit must generate an independent time advance associated with the propagation delay between that non-reference communication unit and the reference communication unit.

In communication systems where non-reference communication elements are highly mobile or in communication systems where propagation time delays are substantial, non-reference communication units must advance transmission timing significantly to comply with the synchronous format of the reference communication unit. When transmission time advances are substantial, a non-reference communication unit may, in fact, be transmitting while another nearby non-reference communication element is attempting to receive a signal transmitted by the reference communication unit. Interference is mitigated by providing frequency and timing diversity when assigning communication channels for transmission and receiving. However, when non-reference communication units are co-located a transmitting non-reference unit may completely prohibit a co-located non-reference communication unit from receiving any signal due to the overbearing nature of the transmit power.

Such obliteration of communication information not only degrades a communication channel containing data, it additionally obliterates control signal information that directs a non-reference communication unit to critical operational information such as the reception of destination of an incoming call, paging data or other system data necessary to establish a call.

Thus what is needed is a method for locating information directing a non-reference communication unit to a channel containing directional information or actual data in the presence of interfering signals when non-reference communication units are co-located. What is also needed is a method for delivering such informational data in the presence of interference when co-located communication units introduce interference to such informational signals. What is also needed is an apparatus for locating such a channel in the presence of interference.

BRIEF DESCRIPTION OF THE DRAWINGS

A more complete understanding of the present invention may be derived by referring to the detailed description and in the claims when considered in connection with the Figures, wherein like reference numbers refer to similar numbers through the Figures and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides among other things, a method for locating a broadcast channel having ring alert and paging data for a plurality of co-located transceivers also known as a mobile exchange unit (MXU). An MXU carries out the invention by evaluating the status of the communication transceivers within the MXU. When none of the co-located transceivers within the MXU are in-use, the present invention directly monitors the assigned ring alert/paging channel containing a frequency and time slot or location of the broadcast channel containing ring alert and paging data. However, when at least one of the co-located transceivers is in-use the MXU evaluates the transmission characteristics of the in-use transceiver to determine if interference with the ring alert/paging channel is probable.

When interference is probable, the MXU determines a location of the broadcast channel by extracting the information from a candidate hand-off list transmitted to the in-use transceiver within the MXU. The hand-off candidate list contains a suite of potential hand-off channels for a transceiver to monitor in preparing to select a more favorable communication channel. The candidate hand-off list additionally comprises the location of the present broadcast channel and can be used by the MXU in determining the location of the broadcast channel containing ring alert and paging data.

The present invention also provides a method for delivering ring alert and paging data to an MXU in the presence of interference. The present invention also provides an MXU capable of locating a broadcast channel having ring alert and paging data in the presence of interference.

Figure 1:
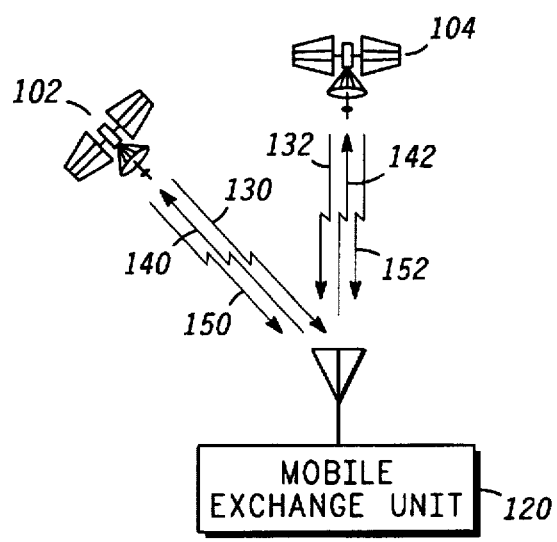
FIG. 1 shows a diagram of a synchronous communication system interacting with co-located transceivers in accordance with a preferred embodiment of the present invention.

FIG. 1 illustrates a synchronous communication system for providing ring alert and paging data to a mobile exchange unit in accordance with a preferred embodiment of the present invention. Reference communication units generating the synchronous format of the communication system are represented as satellite 102 and satellite 104. In the preferred embodiment, satellites 102 and 104 synchronously transmit and receive communication and control signals to mobile exchange unit (MXU) 120. Satellites 102 and 104 are in geosynchronous or non-synchronous orbits in relation to MXU 120. Satellite 102 transmits a ring alert/page transmission 130 to MXU 120. Ring alert/page transmission 130 identifies or denotes individual communication units having a pending call as in the case of a ring alert signal or communication units having paging data to be delivered there-to. In the preferred embodiment, ring alert/page transmission 130 contains a location of a broadcast channel transmission 150 containing MXU-directed ring alert and paging data in a non-interfering portion of the spectrum. A communication transmission 140 represents a transmission from MXU 120 to satellite 102. Communication transmission 140 are voice or data transmissions from MXU 120.

Satellite 104 also contains similar signals such as ring alert paging transmission 132, broadcast channel transmission 152, and communication transmission 142. It should be noted as shown in the figure that propagation delay between satellite 102 with MXU 120 and satellite 104 with MXU 120 vary. That is to say, transmissions originating from satellite 102 require additional time to propagate to MXU 120 than do signals transmitted from satellite 104. Communication transmission 140 require additional propagation time from MXU 120 to satellite 102 than does communication transmission 142 in propagating from MXU 120 to satellite 104. That is to say communication from MXU 120 to satellite 102 must be dispatched earlier in time than a transmission from MXU 120 to satellite 104. When communication transmission 140 requires a substantial time advance to insure synchronous arrival at satellite 102, the potential exists for communication transmission 140 to interfere or obliterate the reception of ring alert/page transmission 130 at MXU 120. In fact, other transceivers within MXU 120 rely upon ring alert/page transmission 130 to direct them to broadcast channel transmission 150 having MXU-directed ring alert and paging data.

Figure 2:
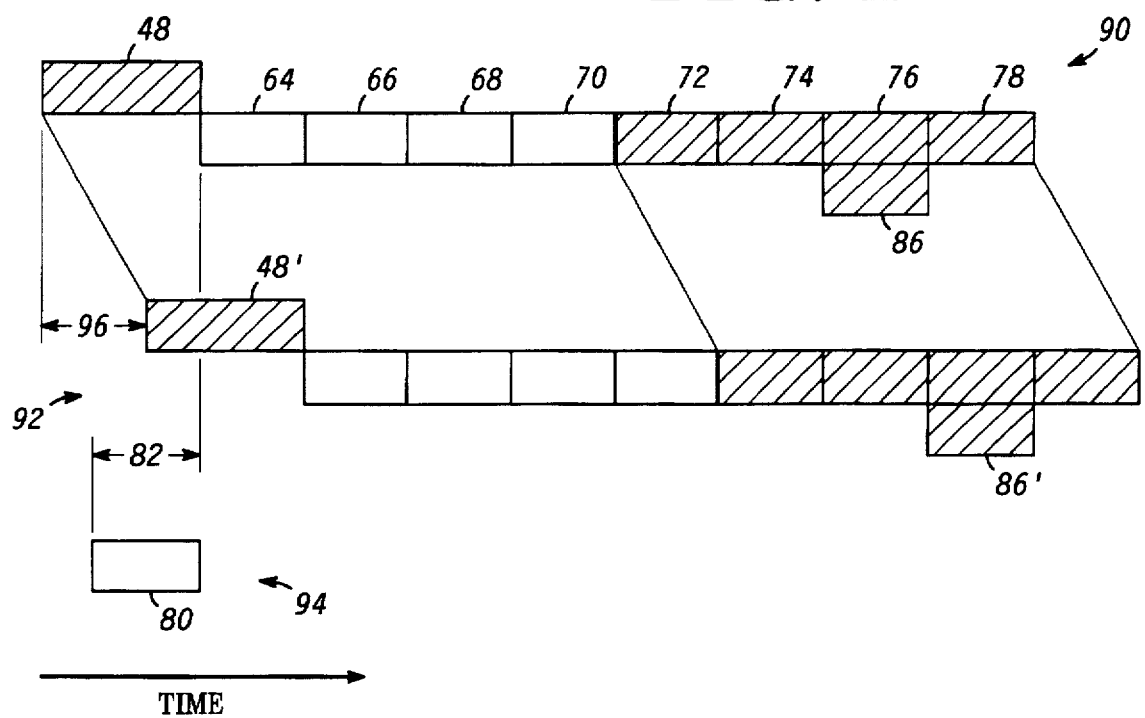
FIG. 2 illustrates frequency and time partitioning of communication channels, in accordance with a preferred embodiment of the present invention.

FIG. 2 illustrates frequency and time partitioning of communication channels, in accordance with the preferred embodiment of the present invention. A satellite time line 90 represents synchronous transmission sequences as exhibited at satellites 102 and 104 of FIG. 1. An MXU perceived time line 92 represents the synchronous time line as perceived by MXU 120 (FIG. 1). A propagation delay 96 represents the time propagation between satellite 102 and MXU 120. Transmission originating at satellites 102 and 104 are shown in FIG. 2 as crosshatch.

Satellite time line 90 further illustrates the partitioning in frequency and time of communication channels, in accordance with the preferred embodiment of the present invention. A ring alert/paging channel 48 corresponds to ring alert/paging transmission 130 of FIG. 1. Ring alert/paging channel 48 comprises the frequency and time slot location of a broadcast channel 86 and identifiers for communication units having pending ring alert messages or paging data. In the present invention, ring alert and paging data directed at co-located transceivers such as MXU 120, is contained within broadcast channel 86 rather than ring alert paging channel 48.

Satellite time line 90 also illustrates the partitioning of uplink and downlink channels with respect to MXU 120. Uplink channels 64 through 70, illustrate receive windows for communication transmissions 140 and 142 (FIG. 1). Downlink channels 72 through 78 represent transmission channels from satellite 102 to MXU 120.

Since satellite 102 (FIG. 1) defines a synchronous transmission format, any transmission by MXU 120 (FIG. 1) destined for satellite 102 must be transmitted in advance of the uplink channels to anticipate propagation delay 96. An MXU transmit time line 94 illustrates a transmit time advance 82 for uplink transmission 80. A transceiver within MXU 120 desiring to communicate in uplink channel 64 must advance the transmission of uplink transmission 80 by a transmit time advance 82. When one transceiver of MXU 120 transmits early, as shown by uplink transmission 80, such a transmission interferes with ring alert/paging channel 48', or a portion thereof. When a portion of ring alert/paging channel 48 is interfered with or obliterated, a co-located transceiver within MXU 120 is precluded from extracting a location of a broadcast channel containing ring alert and paging data from ring alert/paging channel 48'.

Figure 3:
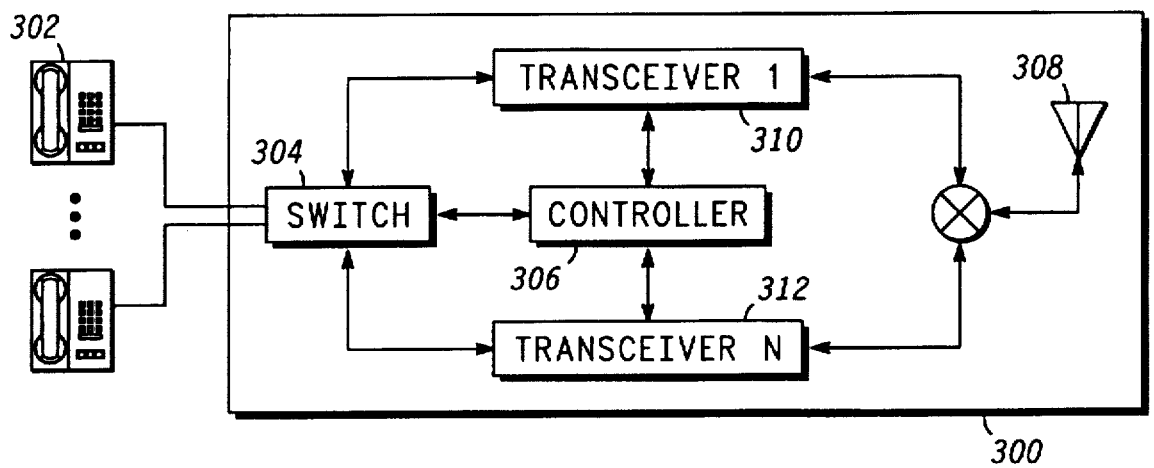
FIG. 3 illustrates a block diagram of co-located transceivers, in accordance with a preferred embodiment of the present invention.

FIG. 3 illustrates a block diagram of an MXU in accordance with the preferred embodiment of the present invention. MXU 300 comprises a plurality of assignable co-located transceivers 310 and 312. Transceivers 310 and 312 directly monitor a ring alert/paging channel as received through antenna 308. A ring alert/paging channel contains a location of a broadcast channel and is monitored by transceiver 310 and when none of transceivers 310 are in-use, the location of the broadcast channel is extracted from the ring alert/paging channel. However when one of transceivers 310 is in-use, transmissions by transceiver 310 may obliterate or interfere with the ring alert/paging channel. Transceiver 310 also receives a candidate hand-off list which additionally contains the location of the broadcast channel for monitoring for ring alert and paging data. The candidate hand-off list is generated by the communication system and delivered to an in-use transceiver in a communication channel (e.g., traffic channel) for continual monitoring of the channels contained within the list. When an in-use transceiver determines that a particular channel within the candidate hand-off list provides a favorable channel, then an in-use transceiver commences hand-off to that channel. The channels within the candidate hand-off list designate channels on different satellites or channels occurring in different beams or cells of the same satellite and also includes the broadcast channel of the local beam or cell.

A controller 306, coupled to transceivers 310 and 312, evaluates the functionality of transceivers 310 and 312. When controller 306 determines that a transceiver is in-use, controller 306 determines the transmit time advance associated with the in-use transceiver 310. When more than one transceiver is in-use, controller 306 solicits the transmit time advance for each of in-use transceivers 310 and 312 to determine a maximum transmit time advance. The maximum transmit time advance is then evaluated to determine if such a transmit time advance causes interference with the ring alert/paging channel. When controller 306 determines a transmit time advance interferes, controller 306 extracts the location of the broadcast channel from the candidate hand-off list as received by an in-use transceiver 310. The location of the broadcast channel is then distributed to transceivers 310 that are not presently in-use.

A switch 304, coupled to controller 306 and transceivers 310 and 312, interface user terminals 302 to transceivers 310 and 312 for communication in communication system 100 (FIG. 1). Switch 304 preferably multiplexes a plurality of user terminals 302 with a plurality of transceivers 310. Switch 304 receives control instructions from controller 306 to connect user terminals 302 with transceivers 310.

Figure 4:
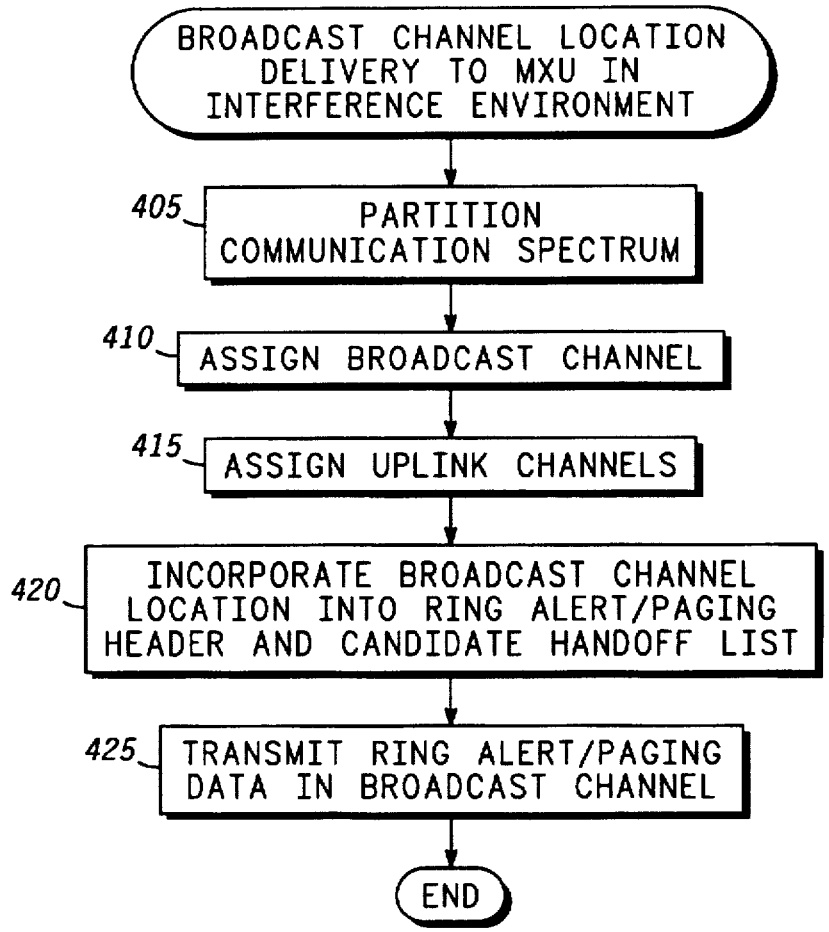
FIG. 4 is a flowchart for locating a broadcast channel having ring alert and paging data for co-located transceivers in accordance with a preferred embodiment of the present invention.

FIG. 4 is a flowchart for delivering ring alert and paging data to an MXU in the presence of interference, in accordance with the preferred embodiment of the present invention. A task 405 partitions the communication spectrum into time domain and frequency domain channels for transceiving frames of data. A frame of data comprises a ring alert/paging header comprising a location of a broadcast channel, and ring alert and paging data associated with non-MXU communication units. In the preferred embodiment, the communication system partitions a spectrum into time domain multiple access (TDMA) and frequency domain multiple access (FDMA) channels.

A task 410 assigns a broadcast channel to a location in relationship to the TDMA channels that is not susceptible to interference from to time advanced transmissions by MXU 120. A task 415 assigns uplink channels (FIG. 2) subsequent to ring alert/paging header.

A task 420 incorporates a location denoting timing and frequency of the broadcast channel in both the ring alert/paging header and the candidate hand-off list. The candidate hand-off list comprises the location of the broadcast channel and a list of other cells for hand-off determination by MXU 120. A task 425 transmits ring alert and paging data to MXU 120 in broadcast channel 86 (FIG. 2).

Figure 5:
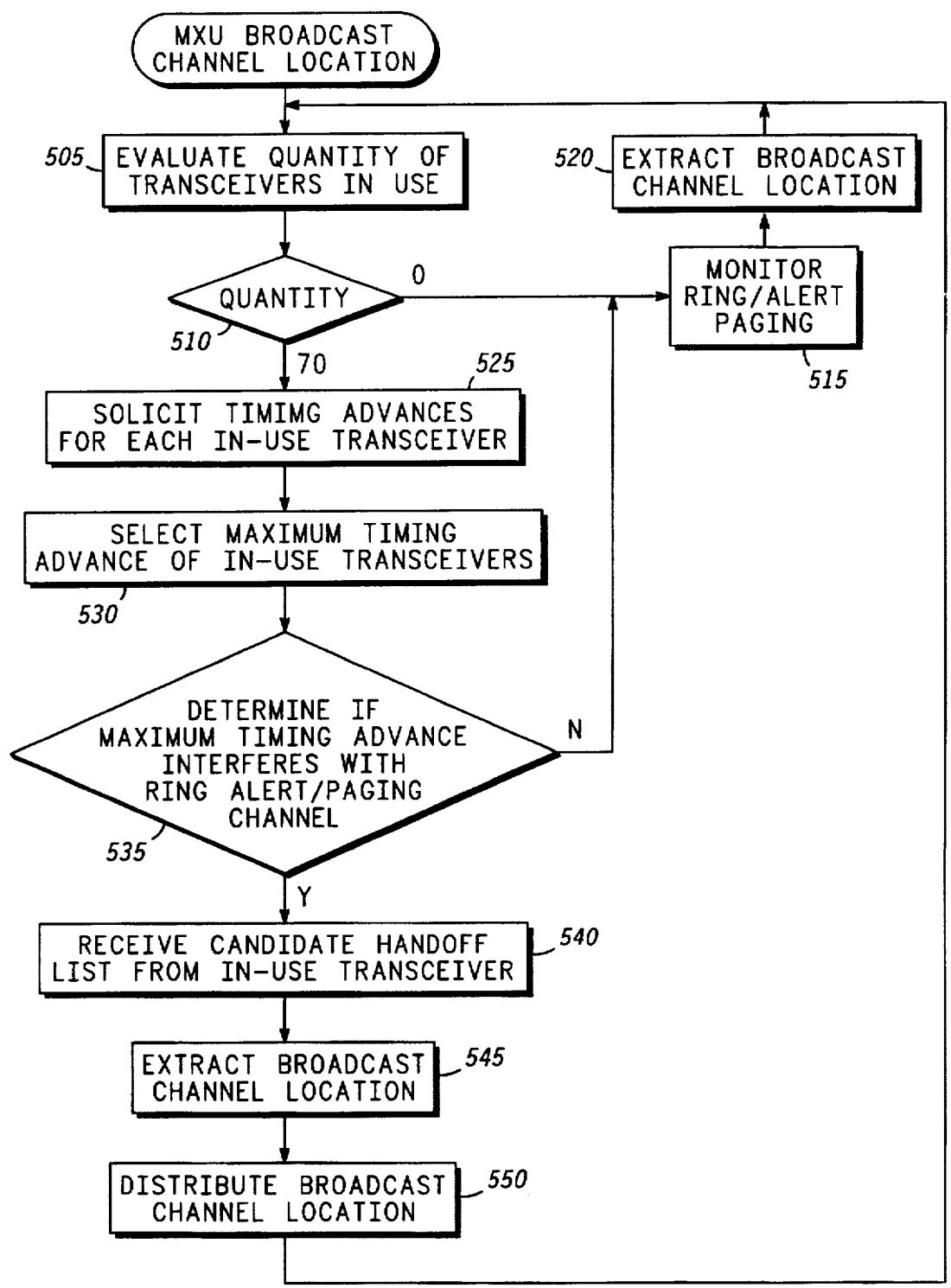
FIG. 5 is a flowchart for delivering ring alert and paging data to co-located transceivers in a communication system in accordance with a preferred embodiment of the present invention.

FIG. 5 is a flow chart of a method for locating a broadcast channel having ring alert and paging data for an MXU in accordance with the preferred embodiment of the present invention. A task 505 evaluates a quantity or a number of transceivers of MXU 120 currently in-use. A transceiver is currently in-use when it engages in transmitting communication data. Such transmissions have the potential of interfering with the reception of ring alert/paging channel 48 (FIG. 2).

A query task 510 elects a task 515 when none of the plurality of assignable co-located transceivers are in-use. When none of transceivers 310 (FIG. 3) are in-use, interference with ring alert/paging channel 48 (FIG. 2) is unlikely and a task 520 directly extracts the broadcast channel location from the ring alert/paging channel. Processing then returns to task 505 to reiterate the evaluation of the current number of transceivers in-use.

When query task 510 determines at least one transceiver 310 (FIG. 3) is presently in-use, a task 525 solicits a transmit time advance for each of the transceivers presently in-use. A transmit time advance denotes a propagation time advance required for synchronous communications dispatched by transceiver 310 (FIG. 3) to arrive at satellite 102 (FIG. 1) during uplink channels 64 through 70 (FIG. 2).

A task 530 selects a maximum transmit time advance from the solicited timing advances of task 525. The maximum transmit time advance is selected as the transmit time advance most likely to cause interference with the ring alert/paging channel 48 (FIG. 2). Thus, referring to FIG. 2, a transceiver assigned to uplink channel 66 has a larger transmit time advance than a transceiver assigned to uplink channel 64 as a much smaller timing advance for uplink channel 64 more immediately encroaches upon ring alert/paging channel 48.

A query task 535 determines if the selected maximum transmit time advance interferes with the ring alert/paging channel 48. When the maximum transmit time advance is determined to not interfere with the ring alert paging channel a task 515 directly monitors the ring alert/paging channel and performs task 520 of extracting the broadcast channel location from the ring alert/paging channel directly. When query task 535 determines that the transmit time advance interferes with ring alert/paging channel 48 (FIG. 2), a task 540 receives a candidate hand-off list from an in-use transceiver 310 (FIG. 3). The candidate hand-off list comprises the location of the broadcast channel and a list of other cells for consideration in the hand-off determination.

A task 545 extracts the location of the broadcast channel from the candidate hand-off list. A task 550 then distributes the broadcast channel location to transceivers within MXU 120 that are not presently in-use. The distribution of the broadcast channel allows those transceivers not receiving candidate hand-off lists to receive the location of a broadcast channel enabling them to monitor for ring alert data and paging data.

In summary, the present invention provides a method and apparatus for locating a broadcast channel having ring alert and paging data for an MXU. The present invention implements this method by evaluating the quantity or number of co-located communication transceivers within the MXU that are presently in-use. When none of the transceivers are in-use, a ring alert/paging channel is monitored directly for the location of the broadcast channel. However, when one of the plurality of co-located transceivers within the MXU is in-use, interference with the reception of the ring alert/paging channel may occur. The method evaluates the transmit time advance associated with in-use transceivers to determine if such transmit time advance potentially interferes with the reception of the ring alert/paging channel. If the method determines interference is possible, then the present invention extracts the location of a broadcast channel from candidate hand-off lists delivered to the in-use transceivers. The location of the broadcast channel is then delivered to transceivers that are presently not in-use allowing those transceivers to locate and monitor the broadcast channel in search of ring alert data and paging data.

The present invention has been described above with references to preferred embodiments. However, those skilled in the art will recognize that changes and modifications may be made in these preferred embodiments without departing from the scope of the present invention. For example, those skilled in the art will appreciate that the precise processes, tasks and task sequencing described herein, may be considerably varied while achieving equivalent functions. These and other changes and modifications which are obvious to those skilled in the art are intended to be included within the scope of the present invention.

What is claimed is:

1. In a mobile exchange unit (MXU) having a plurality of assignable co-located transceivers capable of operating in a communication system having a plurality of cells, a method for locating a broadcast channel having ring alert and paging data for said MXU, said method comprising the steps of:

evaluating said plurality of assignable co-located transceivers to determine the quantity presently in-use;

when none of said plurality of assignable co-located transceivers are in-use, directly monitoring a ring alert/paging channel containing a location of said broadcast channel; and when at least one of said plurality of assignable co-located transceivers is in-use and interferes with said ring alert/paging channel, receiving a candidate hand-off list for said at least one of said plurality of assignable co-located transceivers in-use in one of said plurality of cells, said candidate hand-off list comprising said location of said broadcast channel and a list of others of said plurality of cells for hand-off determination.

2. The method as recited in claim 1, wherein said monitoring step further comprises the step of extracting said location of said broadcast channel from said ring alert/paging channel for monitoring for ring alert data or paging data.

3. The method as recited in claim 1, wherein said receiving step comprises the step of determining if a transmit time advance of said at least one of said plurality of assignable co-located transceivers interferes with said ring alert/paging channel.

4. The method as recited in claim 3, wherein said determining step further comprises the step of soliciting whether said transmit time advance of said at least one of said plurality of assignable co-located transceivers interferes with said ring alert/paging channel.

5. The method as recited in claim 4, wherein said determining step further comprises the step of selecting a maximum transmit time advance from said transmit time advance of said at least one of said plurality of assignable co-located transceivers interferes with said ring alert/paging channel.

6. The method as recited in claim 1, wherein said receiving step further comprises the step of extracting said location of said broadcast channel from said candidate hand-off list for use by said MXU.

7. The method as recited in claim 6, wherein said extracting step further comprises the step of distributing to ones of said plurality of assignable co-located transceivers not in-use said location of said broadcast channel.

8. In a communication system having a plurality of cells, a mobile exchange unit (MXU) for locating a broadcast channel having ring alert data and paging data for said MXU, comprising:

a plurality of assignable co-located transceivers for directly monitoring a ring alert/paging channel containing a location of said broadcast channel when none of said plurality of assignable co-located transceivers are in-use, and for receiving a candidate hand-off list for said at least one of said plurality of assignable co-located transceivers in-use in one of said plurality of cells, said candidate hand-off list comprising said location of said broadcast channel and a list of others of said plurality of cells for hand-off determination when at least one of said plurality of assignable co-located transceivers is in-use and interferes with said ring alert/paging channel; and a controller coupled to said plurality of assignable co-located transceivers for evaluating said plurality of assignable co-located transceivers to determine the quantity presently in-use.

9. The MXU as recited in claim 8, wherein said plurality of assignable co-located transceivers is further configured to extract said location of said broadcast channel from said ring alert/paging channel for monitoring for ring alert data or paging data.

10. The MXU as recited in claim 8, wherein said controller is further configured to determine if a transmit time advance of said at least one of said plurality of assignable co-located transceivers interferes with said ring alert/paging channel.

11. The MXU as recited in claim 10, wherein said controller is further configured to solicit whether said transmit time advance of said at least one of said plurality of assignable co-located transceivers interferes with said ring alert/paging channel.

12. The MXU as recited in claim 11, wherein said controller is further configured to select a maximum transmit time advance from said transmit time advance of said at least one of said plurality of assignable co-located transceivers interferes with said ring alert/paging channel.

13. The MXU as recited in claim 11, wherein said controller is further configured to extract said location of said broadcast channel from said candidate hand-off list for use by said MXU.

14. The MXU as recited in claim 13, wherein said controller is further configured to distribute to ones of said plurality of assignable co-located transceivers not in-use said location of said broadcast channel.

15. The MXU as recited in claim 8, further comprising a switch coupled to said controller for interfacing to and providing communication with a plurality of user terminals when said ring alert data and said paging data indicates communications are directed to said plurality of user terminals.

\* \* \* \* \*